United States Patent
Ringuette et al.

(10) Patent No.: US 9,766,852 B2
(45) Date of Patent: Sep. 19, 2017

(54) NON-AUDIO NOTIFICATION OF AUDIBLE EVENTS

(71) Applicant: Lenovo (Singapore) Pte. Ltd., Singapore (SG)

(72) Inventors: Justin Michael Ringuette, Morrisville, NC (US); Nathan J. Peterson, Durham, NC (US); Guillermo Regulez, Wake Forest, NC (US); John Scott Crowe, Durham, NC (US); Amy Leigh Rose, Chapel Hill, NC (US); Jennifer Lee-Baron, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 742 days.

(21) Appl. No.: 14/155,764

(22) Filed: Jan. 15, 2014

(65) Prior Publication Data

US 2015/0199172 A1 Jul. 16, 2015

(51) Int. Cl.
*G06F 3/16* (2006.01)
*G06F 17/30* (2006.01)

(52) U.S. Cl.
CPC ........ *G06F 3/165* (2013.01); *G06F 17/30743* (2013.01)

(58) Field of Classification Search
None
See application file for complete search history.

(56) References Cited

U.S. PATENT DOCUMENTS

| | | | | |
|---|---|---|---|---|
| 2008/0161057 | A1* | 7/2008 | Nurminen | G10L 13/033 455/563 |
| 2012/0308044 | A1* | 12/2012 | Vander Mey | H04L 12/1822 381/104 |
| 2013/0220102 | A1* | 8/2013 | Savo | G06F 3/0481 84/609 |
| 2013/0297319 | A1* | 11/2013 | Kim | G10L 15/22 704/275 |
| 2013/0329863 | A1* | 12/2013 | Bentley | H04M 3/40 379/32.01 |
| 2014/0129235 | A1* | 5/2014 | Suvanto | G10L 15/22 704/276 |

* cited by examiner

*Primary Examiner* — Tuan S Nguyen
(74) *Attorney, Agent, or Firm* — Ference & Associates LLC

(57) ABSTRACT

An aspect provides a method, including: receiving audio input via an audio receiver of an information handling device; matching, using a processor, the audio input to a predetermined audio; and providing a non-audio notification matched to the predetermined audio. Other aspects are described and claimed.

20 Claims, 3 Drawing Sheets

NON-AUDIO NOTIFICATION OF AUDIBLE EVENTS

BACKGROUND

Information handling devices ("devices") come in a variety of forms, for example laptop computing devices, tablet computing devices, smart phones, other hand-held or mobile devices, wearable devices, in-car consoles, and the like. Such devices are often used in situations where notifications are issued to a user.

Notifications may be provided in a variety of formats, e.g., visible notifications, such as flashing lights, displayed messages, etc., audible notifications such as chimes, ringtones, etc., tactile or haptic notifications such as vibrating actuators or buzzers, etc. Notifications may be issued for a variety of reasons, e.g., a message notification such as a notification of an incoming email message or an incoming phone call, as well as for other reasons, e.g., a feedback indication of a detected noise such as with a baby monitor that provides a corresponding visual indication, an indication of an output noise, e.g., as with a speaker system, etc.

BRIEF SUMMARY

Another aspect provides a system, comprising: an audio receiver; a processor; and a memory device that stores instructions accessible to the processor, the instructions being executable by the processor to: receive audio input via the audio receiver; match the audio input to a predetermined audio; and provide a non-audio notification matched to the predetermined audio.

A further aspect provides a product, comprising: a storage device having code stored therewith, the code comprising: code that receives audio input via an audio receiver of an information handling device; code that matches, using a processor, the audio input to a predetermined audio; and code that provides a non-audio notification matched to the predetermined audio.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description.

DETAILED DESCRIPTION

Figure 1:
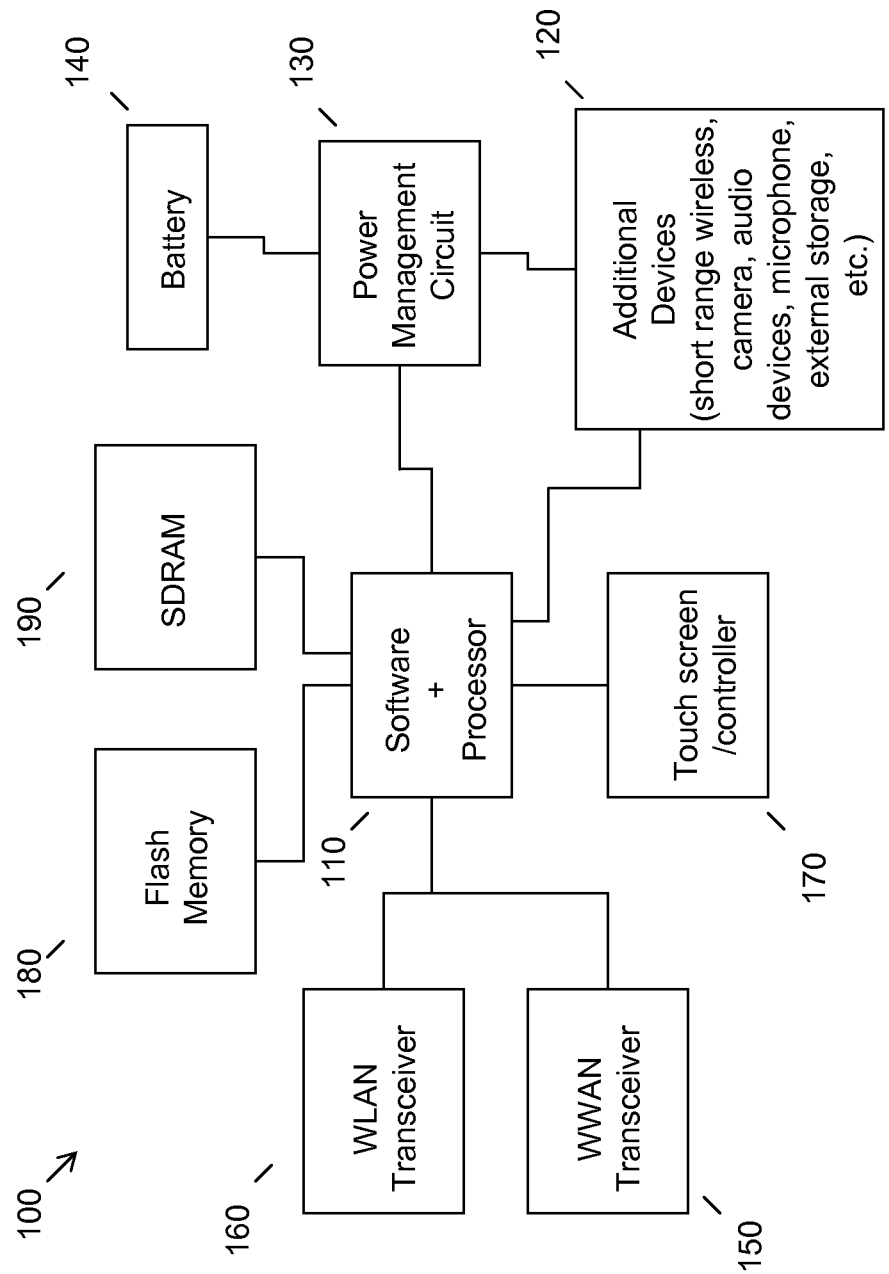
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Devices provide notifications in a variety of formats and for a variety of reasons. Often one format of notification may be more appropriate than others. For example, in a noisy environment, an audible notification may go unnoticed by the majority of users. Moreover, for certain users, e.g., those that are hearing impaired, audible notifications may routinely go unnoticed. Further, devices often provide notification of device-based events, e.g., incoming phone call, SMS text message received, email received, etc.

A device that notifies the user of certain off-device events, e.g., a doorbell ringing, a child crying, a car horn, etc., would be useful. Conventionally, devices providing indications that a noise is detected amplify the noise, e.g., as with a hearing aid, and/or provide a standard, non-specific notification (e.g., standard buzzer of flashing light) indicating a noise is detected, and perhaps a feedback indicator, e.g., of the level of the noise. However, these notifications do not indicate or notify the user as to which particular noise is detected by the device.

Accordingly, embodiments provide devices, products and methods that receive or detect a noise, map the audio of the noise to a known noise based on characteristics of the received audio, e.g., map it to a predetermined noise that is provided in a default audio library and/or stored audio that is learned by the device, and map the detected or received noise to a non-audio indication for notifying the user in a non-audible way that a particular noise has been detected, e.g., using an association between the known noise and a non-audio indication.

By way of example, for a wearable device such as a head-mounted display that provides visual feedback in response to noise, an embodiment allows the device to be trained to distinguish noises (e.g., a doorbell, a crying baby, etc.) by sound characteristics thereof and provide the user with a non-audio notification, e.g., visual indication, haptic indication, etc., that is customized, e.g., for each recognized sound or sound category.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit. BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included, e.g., a microphone. System 100 often includes a touch screen 170 for data input and display/rendering. System 100 also typically includes various memory devices, fir example flash memory 180 and SDRAM 190.

Figure 2:
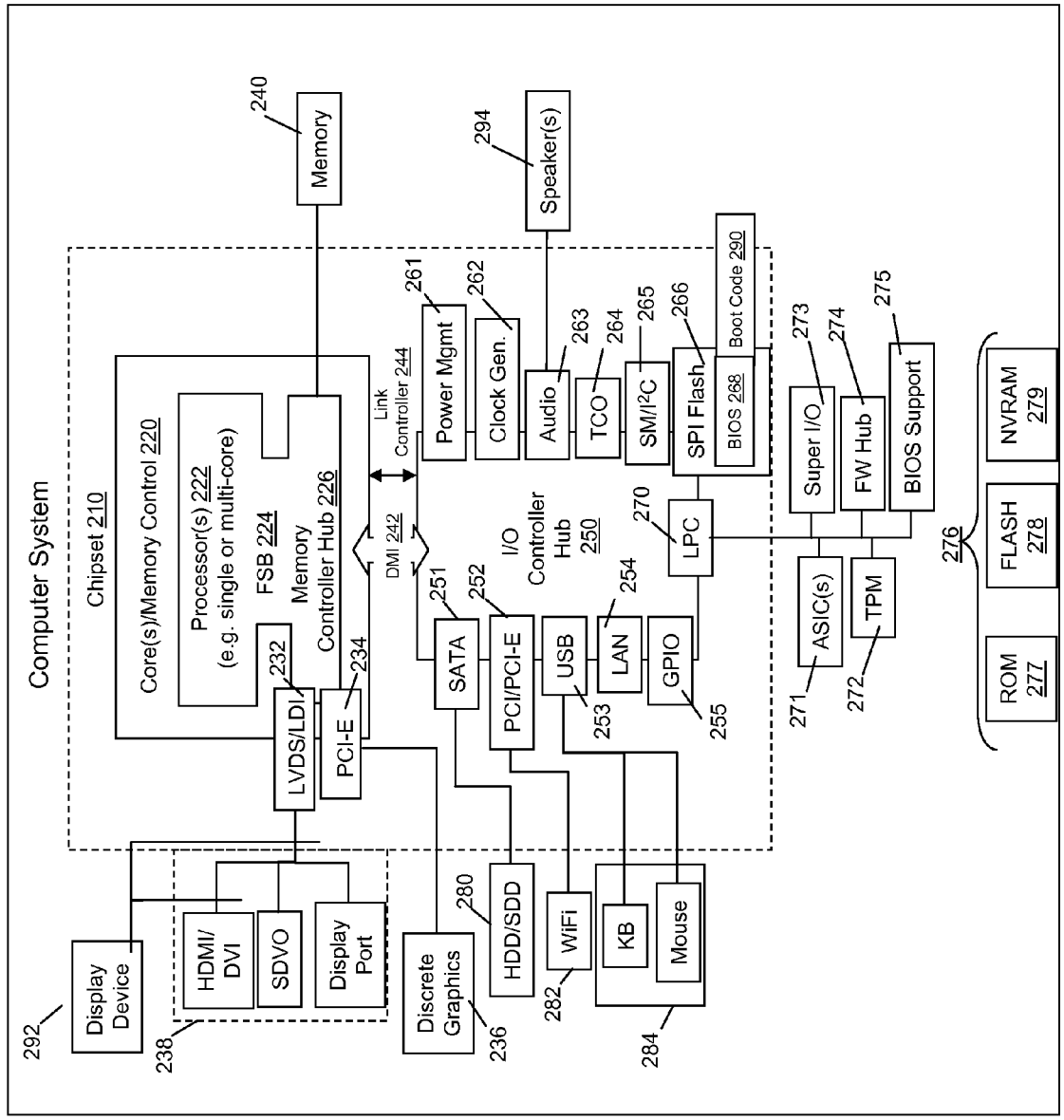
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, ouch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The sys em, upon power on, may be configured to execute boo code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be included in user devices such as wearable device, a smart phone, a tablet computing device, a hand held device, in-vehicle (e.g., car) devices, etc., with which a user receives notifications. As described herein, providing non-audio notifications for audio events is valuable in certain circumstances, e.g., for users that have a hearing impairment, in noisy environments, etc. Such users sometimes do not know when certain events are occurring (e.g., a doorbell ringing, a child crying, a car sounding its horn, etc.).

Figure 3:
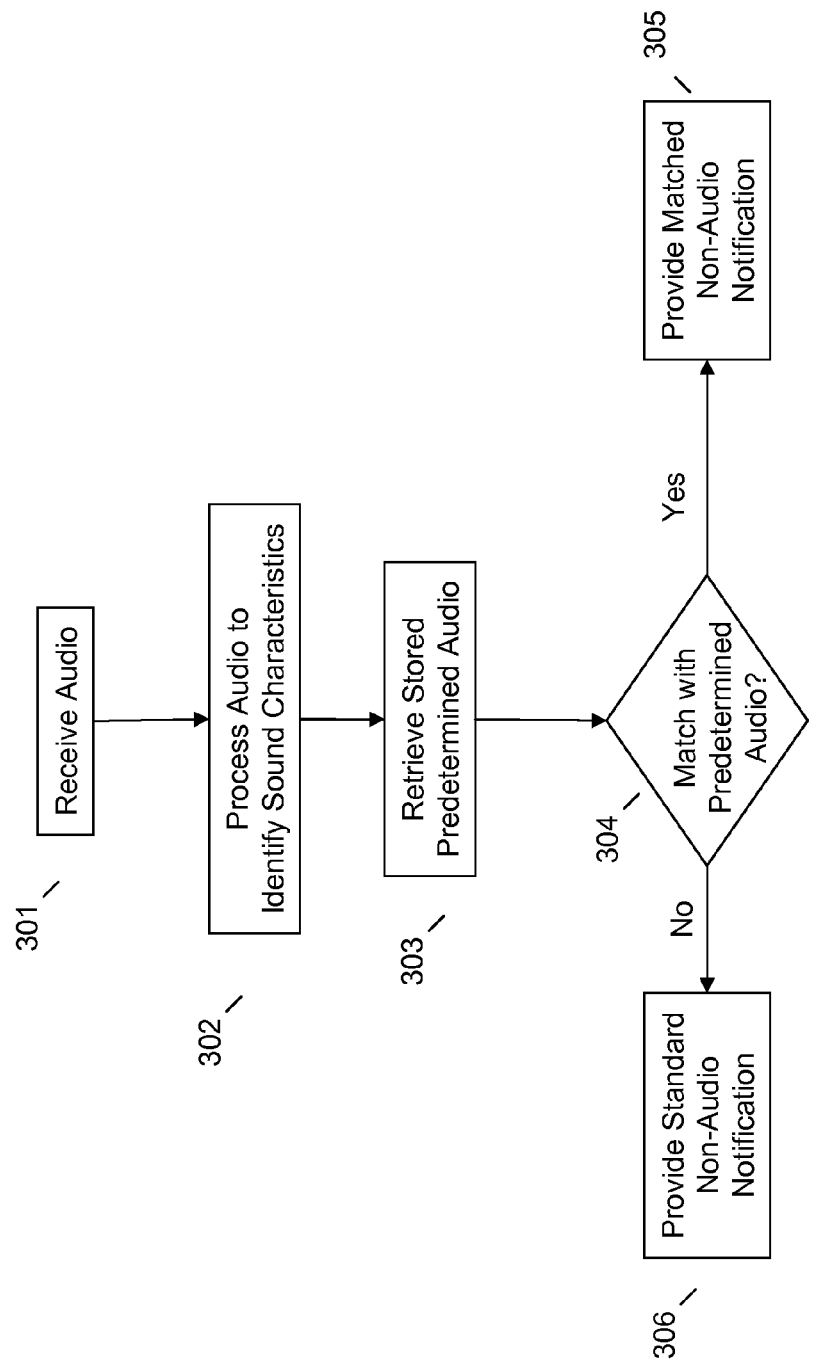
FIG. 3 illustrates an example method of providing non-audio notification of audible events.

Accordingly, referring to FIG. 3, an embodiment provides a non-audio notification, e.g., a visual notification, of audible events. An embodiment receives audio, e.g., using a microphone or microphone array (e.g., if directionality of received audio is of interest, as further described herein) at 301. An embodiment processes the received audio to extract sound characteristics for matching it to known noises, e.g., as represented in audio files or information derived therefrom. A variety of techniques may be used to match the received audio with known audio.

For example, an embodiment may store (or access a store of) predetermined audio or data describing the predetermined audio from a library at 303. By way of example, certain sounds and/or sound categories may be provided in an audio library by default. Thus, an embodiment may have access to sound characteristic data (e.g., prepared based on signal processing, pattern recognition, audio modeling, and/or machine learning techniques) that is retrieved at 303 for comparison with like characteristics prepared from the received audio. If an embodiment determines a match at 304, i.e., the received sound characteristics match a predetermined sound's characteristics at or above some threshold level, an embodiment may provide a non-audio sound that is associated or matched to the predetermined sound identified at 305. Otherwise, an embodiment may provide a standard non-audio notification that is not customized to the received audio at 306.

By way of example, an embodiment such as a wearable device may receive audio at 301, e.g., via a microphone or microphone array, and process the audio at 302 to form a set of sound characteristics to be used for matching. An embodiment then may access stored audio/audio characteristic data at 302, e.g., stored on the device or accessible therefrom, and compare the received audio's characteristics to known sounds represented by the stored audio. If a match is determined at 304, e.g., the received sound is matched to a door bell based on audio characteristic data, an embodiment may provide a visual notification, e.g., on a display device of the wearable device, such as a text message or an icon indicating that a door bell sound has been detected. This apprises the user of the detected audio event using anon-audio notification.

In the above example, the door bell sound may be "known" to an embodiment either via being included in a default audio library (e.g., standard door bell).

The audio/audio characteristic data may be categorized, e.g., to map to a common notification such as a visible icon for a sound category. Thus, a user's device that receives one of a plurality of potential door bell sounds may provide a common door bell icon. Likewise, a device receiving audio corresponding to a car's horn, even if many such sounds are possible, may map the various car horn sounds to a common car horn visual icon, e.g., presented on an in-car display.

An embodiment may employ a microphone array for adjusting the notification provided to the user. For example, in an in-car context, an embodiment may provide a visual icon on an in-car display indicating which direction a car horn sound originated based on how it was received at the microphone array. Thus, the user may be apprised of the location of the car sounding its horn. The adjustment of the notification may take a variety of forms, e.g., the same icon displayed in a different area of a display screen, different icons displayed based on directionality, a combination of icons displayed, etc.

Other non-audio notifications may be provided. Thus, in addition to or in lieu of a visual notification, an embodiment may provide notifications using other mechanisms, e.g., haptic feedback such as an actuator providing vibration to a device component. These other notifications likewise serve to provide a notification to the user without relying on the sense of sound.

From the foregoing, it will be understood that an embodiment receives audio, e.g., ambient audio from the surrounding environment, and as opposed to merely notifying the user that some sound (any sound) has been detected, an embodiment maps the sound to a predetermined sound or sound category such that the user may be apprised of the detected sound using a non-audio channel or feedback mechanism.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving audio input via an audio receiver of an information handling device;
   matching, using a processor, the audio input to a predetermined audio sound type;
   determining a direction of the audio input; and
   providing a visual notification of the audio input, wherein the provided visual notification comprises the matched predetermined audio sound type and is based upon the determined direction of the audio input.

2. The method of claim 1, wherein providing the non-audio notification comprises displaying on a display device a visual notification matched to the predetermined audio.

3. The method of claim 2, wherein the visual notification comprises an icon visually representing the predetermined audio.

4. The method of claim 2, wherein the predetermined audio is selected from the group consisting of default predetermined audio and user trained audio.

5. The method of claim 4, wherein the predetermined audio is categorized into predetermined groups of sounds having visual indications associated therewith.

6. The method of claim 2, wherein the display device is selected from the group consisting of a display device of a wearable device and an in car display device.

7. The method of claim 1, wherein the audio receiver comprises a microphone array.

8. The method of claim 7,
   wherein the determining a direction of the audio input comprises using the microphone array.

9. The method of claim 1, wherein said matching comprises matching non-amplitude sound characteristics.

10. The method of claim 1, wherein providing the non-audio notification comprises providing a haptic notification matched to the predetermined audio.

11. A system, comprising:
an audio receiver;
a processor; and
a memory device that stores instructions accessible to the processor, the instructions being executable by the processor to:
receive audio input via the audio receiver;
match the audio input to a predetermined audio sound type;
determine a direction of the audio input; and
provide a visual notification of the audio input, wherein the provided visual notification comprises the matched predetermined audio sound type and is based upon the determined direction of the audio input.

12. The system of claim 11, wherein to provide the non-audio notification comprises displaying on a display device a visual notification matched to the predetermined audio.

13. The system of claim 12, wherein the visual notification comprises an icon visually representing the predetermined audio.

14. The system of claim 12, wherein the predetermined audio is selected from the group consisting of default predetermined audio and user trained audio.

15. The system of claim 14, wherein the predetermined audio is categorized into predetermined groups of sounds having visual indications associated therewith.

16. The system of claim 12, wherein the display device is selected from the group consisting of a display device of a wearable device and an in car display device.

17. The system of claim 11, wherein the audio receiver comprises a microphone array.

18. The system of claim 17, wherein the instructions executable by the processor to determine the direction of the audio input comprises instructions executable by the processor to determine using the microphone array.

19. The system of claim 11, wherein to provide the non-audio notification comprises providing a haptic notification matched to the predetermined audio.

20. A product, comprising:
a storage device that is not a signal having code stored therewith, the code comprising:
code that receives audio input via an audio receiver of an information handling device;
code that matches, using a processor, the audio input to a predetermined audio sound type;
code that determines a direction of the audio input; and
code that provides a visual notification of the audio input, wherein the provided the visual notification comprises the matched predetermined audio sound type and is based upon the determined direction of the audio input.

\* \* \* \* \*